Feb. 24, 1925.

E. E. DAVIDSON ET AL 1,527,953

METHOD AND APPARATUS FOR PRODUCING MOLDABLE BLANKS OF PLASTIC MATERIAL

Filed June 13, 1922

Inventors
E.E. Davidson.
J.R. Gammeter.
By Robert M. Pierson
Atty.

Patented Feb. 24, 1925.

1,527,953

UNITED STATES PATENT OFFICE.

ELIAS E. DAVIDSON AND JOHN R. GAMMETER, OF AKRON, OHIO, ASSIGNORS TO THE B. F. GOODRICH COMPANY, OF NEW YORK, N. Y., A CORPORATION OF NEW YORK.

METHOD AND APPARATUS FOR PRODUCING MOLDABLE BLANKS OF PLASTIC MATERIAL.

Application filed June 13, 1922. Serial No. 567,969.

*To all whom it may concern:*

Be it known that we, ELIAS E. DAVIDSON and JOHN R. GAMMETER, citizens of the United States, residing at Akron, in the county of Summit and State of Ohio, have invented a certain new and useful Method and Apparatus for Producing Moldable Blanks of Plastic Material, of which the following is a specification.

This invention relates to the art of producing blanks of plastic material such as a vulcanizable rubber composition. Blanks for making rubber heels for footwear, which may be taken as an example, commonly have been formed by passing the stock through a tube machine to form a strip and then cutting heel blanks from the strip. This process is relatively slow and laborious as compared with sheeting the stock between rolls and then cutting blanks from the sheet with a die, as heretofore has been done in forming certain thin stock units such as shoe parts, but sheeted stock suitable for forming thick blanks such as those required for heels has not been produced heretofore, so far as we are aware. When sheeted stock of sufficient thickness is so formed, with either even-speed or odd-speed rolls, it does not have the necessary uniformity of thickness and smoothness of surface for the best quality of blanks.

Our general object is to provide an improved, labor-saving and time-saving method of producing moldable blanks of plastic material, and to provide apparatus adapted to carry out said method. More specifically our object is to provide a method and apparatus whereby thick blanks such as heel blanks may be produced from sheeted stock.

Figure 1:
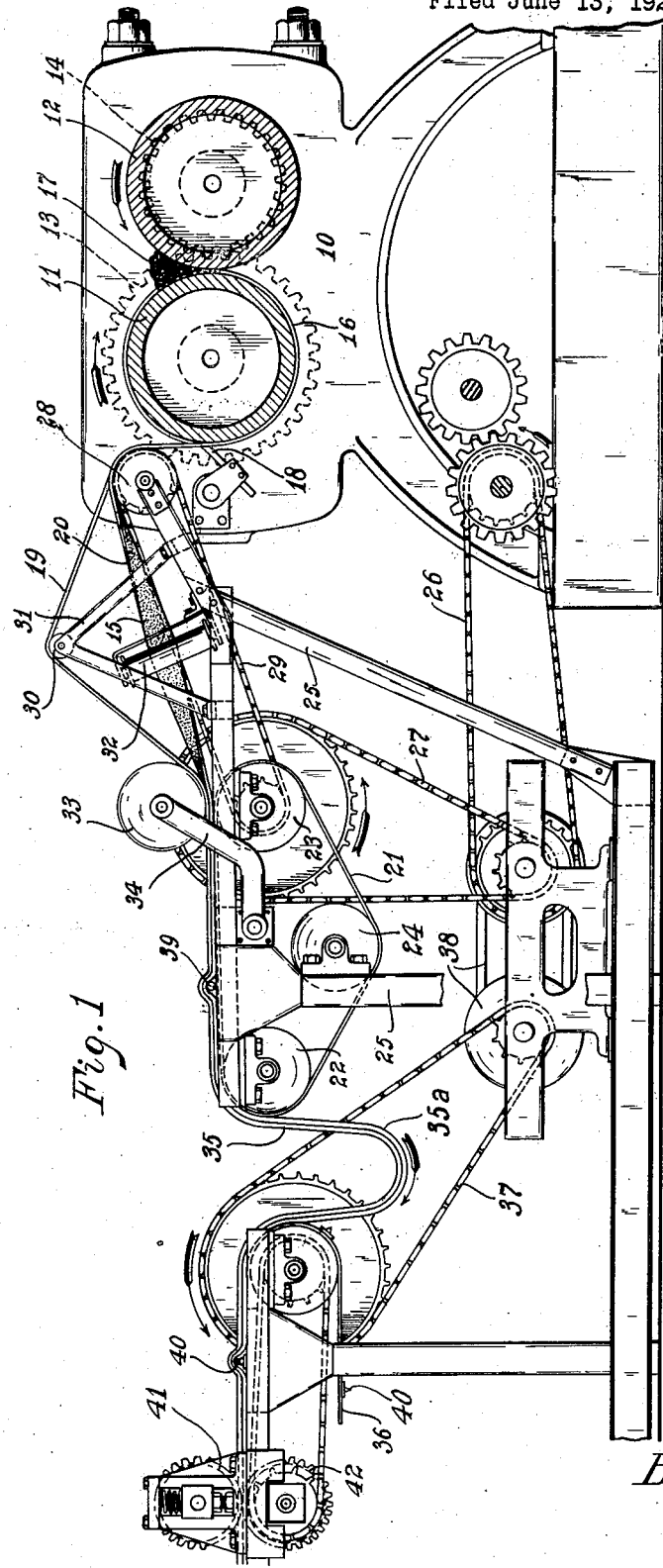
Fig. 1 is a side elevation, with parts broken away and parts in section, of apparatus embodying and adapted to carry out our invention.
Figure 2:
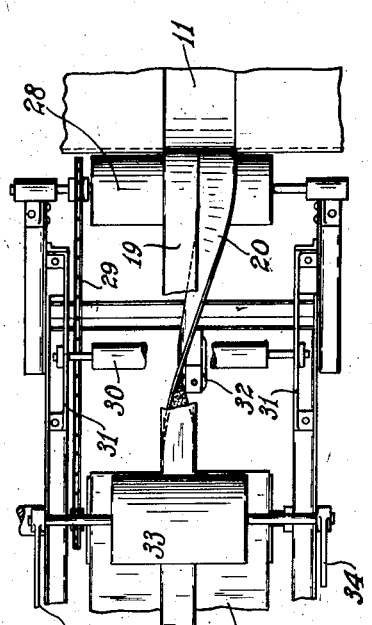
Fig. 2 is a fragmentary plan view of a part of the same.

Referring to the drawings, 10 is a rubber mixing or warming mill of a common type, its rolls 11, 12 being provided with intermeshed driving gears 13, 14 respectively, the gear 14 being the smaller, so that the roll 12 will be driven faster than the roll 11, and while imparting a roughened surface, 15, to the adjacent side of a sheet of stock 16 formed from a bank of rubber compound 17 on said rolls, will assure that the sheet will uniformly follow, and be formed with a smooth side against, the slower roll 11. 18 is one of a set of slitting knives mounted on said mill and adapted to act against the roll 11 to slit the sheeted stock 16 to produce a plurality of strips such as 19, 20.

For withdrawing said strips from the mill, and endless belt carrier 21, mounted upon end rolls 22, 23 and provided with a tightener roll 24, is placed adjacent the mill, said rolls being journaled in a frame 25 and the end roll 23 being adapted to be driven from the mill, preferably at a slightly faster peripheral speed than that of the roll 11, through sprocket chains 26, 27 and the related driving elements shown. A strip-guiding and take-off roll 28 is journaled on the frame 25 near the mill roll 11 and adapted to be driven, at substantially the same peripheral speed as that of the endless belt carrier 21, by a sprocket chain 29 from the driving-apparatus of said belt carrier.

Between the take-off roll 28 and said endless belt carrier we provide means for progressively inverting the stock strip 20 and guiding it under the strip 19 with its roughened side 15 toward the latter, so that the two strips will be joined in parallel relation with their roughtened faces together.

Said means comprises a horizontal guide roll 30 for the strip 19, said roll being loosely journaled in brackets 31, 31 rising from the frame 25 and so positioned as to guide the strip upward out of a direct course from the take-off roll 28 to the endless belt 21, without turning said strip upon its own axis or laterally diverting it, and a substantially vertical guide roll 32 for the strip 20, the latter guide roll being positioned between the brackets 31 and adapted to twist said strip 20 into a vertical plane and guide it directly under the strip 19, as the endless belt 21 draws said strip past said roll from the take-off roll 28. For pressing the strip 19 adhesively onto the strip 20, and pressing both against the endless belt carrier 21 to insure their being driven thereby, a presser roller 33 is loosely journaled between a pair of swinging arms 34, 34 pivoted on the frame 25, said presser roll being adapted to ride upon the work directly over the end-roll 23 of the belt carrier, and thus to roll the two strips progressively together, at their point of meeting, so as to expel the air from between them and avoid the entrapping of such air.

For further disposing of the plied-up strip, 35, as it passes from the carrier 21, we preferably provide a second endless belt carrier 36, positioned a short distance from the carrier 21, so as to provide for a storage loop 35$^a$ in the strip 35 between said carriers.

The carrier 36 is adapted to be driven, through a sprocket chain 37 and a variable speed device 38, and the associated driving elements shown, from the mill, the variable speed device being provided in order that shrinkage of the stock after it passes the presser roll 33 may be compensated and the speeds of the two carriers 21 and 36, so adjusted as to avoid undue variations in the length of the storage loop 35$^a$.

To break such adhesion as may occur between the strip 35 and the endless belt 21, due to the pressure of the roll 33, a stationary transverse bar 39 may be supported just over the upper reach of said belt and thus adapted to force the two apart as the strip is carried forward, past said bar, by the belt.

For severing the strip 35 into suitable lengths for handling, the endless belt 36 is provided on its outer surface with a series of spaced, transverse knives 40, 40, adapted to sever the strip as the latter is carried forward, upon the upper reach of said belt, between a pair of rolls 41, 42, the roll 42 being journaled under the upper reach of said belt and adapted to support it against the pressure of the roll 41, which is yieldingly mounted directly over the roll 42 and thus adapted to press the strip 35 onto the knives 40, said rolls 41 and 42 being adapted to be driven from the driving mechanism of the carrier 36, as clearly shown in Fig. 1.

In the operation of the apparatus, power being applied to the mill and through it to the rest of the apparatus, the leading ends of the strips 19, 20 are carried side by side over the take-off roll 28 and past their respective guide rolls 30 and 32 as shown, the strip 20 being turned over and brought into alignment under the strip 19, and are started between the presser roll 33 and the belt carrier 21. These members preferably draw said strips forward slightly faster than they are given off by the mill, slightly stretching them, so as to assure that they will be sufficiently taut at all times, and progressively roll them together at their meeting point, so that the air is driven out from between them and they are firmly stuck together, while still warm from the mill.

As the leading end of the combined strip 35 proceeds from the presser roll 33 it is lifted by hand over the bar 39, which thereafter continues to loosen the strip from the belt carrier 21, and said leading end is started upon the carrier 36 with sufficient slack to provide the storage loop 35$^a$. The speed of the carrier 36 being properly adjusted by means of the variable-speed device 38, said carrier constantly draws the work forward, while the knives 40, acting against the roll 41, sever it into convenient lengths. The variable speed device 38 and the storage loop 35$^a$ permit the stock to retract, from the stretch imparted by the carrier 21 and because of its cooling, before it passes onto the carrier 36, so that the sections into which it is cut by the knives 40 will substantially retain their form and dimensions after being cut.

Figure 3:
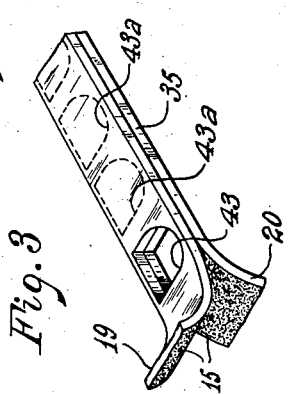
Fig. 3 is a perspective view of a stock strip produced by our invention, showing its relation to the finished blank.

Heel or other blanks may be cut from the severed lengths by means of a die (not shown) as indicated at 43, 43$^a$, 43$^e$ in Fig. 3.

The blanks thus formed are smooth surfaced, substantially free from pocketed air, and the halves of which they are composed are firmly united so as to withstand handling and are adapted completely to coalesce in the subsequent vulcanization, if not already so coalesced.

While the formation of only one combined stock strip has been shown and described, it will be understood that several such strips, of greater or less width, may be simultaneously formed on the same apparatus. Moreover, we do not wholly limit our invention to the use of a single mill or the slitting of the sheeted stock. While we prefer to use odd-speed rolls, assuring that the stock will constantly follow, and be formed with a smooth side against, the slower roll, we do not wholly limit our claims thereto.

Modifications may be resorted to without departing from the scope of our invention, and we do not wholly limit our claims to the specific construction or the exact mode of procedure shown or described.

We claim:

1. The method of producing moldable blanks of plastic material which comprises passing said material between odd-speed rolls, to sheet it, each sheet having a smooth and a rough face opposite each other, progressively joining two of said sheets with their rough faces together by rolling pressure applied at their point of initial contact, and cutting blanks therefrom.

2. The method of producing moldable blanks of plastic material which comprises rolling said material into sheet form, the sheet having a smooth and a rough face, progressively slitting said sheeted material into strips as it is sheeted, progressively feeding two of said strips from slitting position into face to face contact with their rough faces together, pressing said strips together by rolling pressure to unite them, and cutting blanks from said united strips.

3. Apparatus for producing moldable blanks of plastic material, said apparatus comprising odd-speed rolls adapted to form two sheets of said material each having a rough face, and means for feeding said sheets from said forming means into face to face contact with their rough faces together.

4. Apparatus for producing moldable blanks of plastic material, said apparatus comprising odd-speed rolls adapted to form two sheets of said material each having a rough face, means for feeding said sheets from said forming means into face to face contact with their rough faces together, and means for applying rolling pressure progressively to said sheets at their point of initial contact to unite them.

5. Apparatus for producing moldable blanks of plastic material, said apparatus comprising a pair of rolls adapted to sheet said material, means for progressively slitting said material into strips as it is sheeted, means for guiding one of said strips onto another, and rolling means for pressing said strips together, said rolling means being adapted to draw said strips from said sheeting rolls past said slitting means and said guiding means.

6. Apparatus for producing moldable blanks of plastic material, said apparatus comprising a pair of rolls adapted to sheet said material, means for progressively slitting said material into strips as it is sheeted, a pair of rotary members adapted to draw said strips from said rolls past said slitting means, and guide rollers for said strips between said sheeting rolls and said rotary members, a guide roller for one of said strips being so positioned as to twist said strip by contact with one of its broader faces and to guide it into parallel relation and face to face contact with another of said strips, as the latter passes between said rotary members.

7. Apparatus for producing moldable blanks of plastic material, said apparatus comprising a pair of odd-speed rollers adapted to sheet said material, means for withdrawing the sheeted material from said rolls, means for slitting said material into strips as it is so withdrawn, and guiding means adapted to invert one of said strips and guide it into face to face contact with another of said strips.

In witness whereof we have hereunto set our hands this 9 day of June, 1922.

JOHN R. GAMMETER.
ELIAS E. DAVIDSON.